US011335516B2

(12) United States Patent
Yoo et al.

(10) Patent No.: US 11,335,516 B2
(45) Date of Patent: May 17, 2022

(54) HIGH-CAPACITY MICRO-SUPERCAPACITOR, METHOD OF MANUFACTURING HIGH-CAPACITY MICRO-SUPERCAPACITOR, AND METHOD OF FORMING CURRENT COLLECTOR FOR MICRO-SUPERCAPACITOR

(71) Applicant: KOREA INSTITUTE OF ENERGY RESEARCH, Daejeon (KR)

(72) Inventors: Jung Joon Yoo, Daejeon (KR); Jong Huy Kim, Daejeon (KR); Yong Il Kim, Daejeon (KR); Jeong Hun Baek, Daejeon (KR); Ha Na Yoon, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 544 days.

(21) Appl. No.: 16/361,050

(22) Filed: Mar. 21, 2019

(65) Prior Publication Data
US 2019/0333716 A1    Oct. 31, 2019

(30) Foreign Application Priority Data

Apr. 30, 2018 (KR) .................. 10-2018-0049897

(51) Int. Cl.
*H01G 11/86*    (2013.01)
*H01G 11/70*    (2013.01)
*H01G 11/28*    (2013.01)
*H01G 11/58*    (2013.01)
*H01G 11/68*    (2013.01)

(52) U.S. Cl.
CPC .............. *H01G 11/86* (2013.01); *H01G 11/28* (2013.01); *H01G 11/70* (2013.01); *H01G 11/58* (2013.01); *H01G 11/68* (2013.01)

(58) Field of Classification Search
CPC ........ H01G 11/86; H01G 11/28; H01G 11/70; H01G 11/58; H01G 11/68
See application file for complete search history.

(56) References Cited

U.S. PATENT DOCUMENTS

2014/0272547 A1* 9/2014 Ramasubramanian .....................
H01M 10/052
429/163
2016/0126558 A1* 5/2016 Lewis ..................... H01M 4/70
429/152

FOREIGN PATENT DOCUMENTS

KR    10-1148126 B1    5/2012
KR    10-1582768 B1    1/2016

OTHER PUBLICATIONS

Lewis, Direct Ink Writing of 3D Functional Materials, 2006, Adv. Funct. Mater., 16, 2193-2204 (Year: 2006).*

(Continued)

*Primary Examiner* — Helen Oi K Conley
(74) *Attorney, Agent, or Firm* — Birch, Stewart, Kolasch & Birch, LLP (57) ABSTRACT

Disclosed herein is a method of manufacturing a micro-supercapacitor with an increased storage capacity of electrical energy. The method is a method of manufacturing a high-capacity micro-supercapacitor including an anode and a cathode separated from each other, which includes forming a pair of current collectors by discharging conductive ink on a substrate surface with a 3D printer, and forming an electrode consisting of an anode and a cathode by stacking an electrode constituting material in the form of a plurality of layers on each of the pair of current collectors using the 3D printer.

10 Claims, 8 Drawing Sheets

(56) References Cited

OTHER PUBLICATIONS

Zhang et al., 3D printing technologies for electrochemical energy storage, 2017, Nano Energy 40, 418-431 (Year: 2017).*

* cited by examiner

HIGH-CAPACITY MICRO-SUPERCAPACITOR, METHOD OF MANUFACTURING HIGH-CAPACITY MICRO-SUPERCAPACITOR, AND METHOD OF FORMING CURRENT COLLECTOR FOR MICRO-SUPERCAPACITOR

CROSS REFERENCE TO RELATED APPLICATION

This non-provisional application claims the benefit under 35 U.S.C. § 119(a) to Patent Application No. 10-2018-0049897, filed in the Republic of Korea on Apr. 30, 2018, all of which is hereby expressly incorporated by reference into the present application.

BACKGROUND OF THE INVENTION

Field of the Invention

The present invention relates to a supercapacitor for storing electrical energy, and more particularly, to a method of manufacturing a micro-supercapacitor having a very small size.

Description of the Related Art

In general, supercapacitors are sometimes referred to as electric double layer capacitors (EDLCs) or ultra-capacitors. Unlike a battery that utilizes chemical reaction, such a supercapacitor is an energy storage device that utilizes a charging phenomenon by simple migration of ions to electrode and electrolyte interfaces or surface chemical reaction.

Specifically, the supercapacitor consists of an electrode attached to a conductor and an electrolyte solution impregnated in the electrode, and uses a pair of charge layers (electric double layers), having different signs, formed on electrode interfaces. The supercapacitor exhibits high charge/discharge efficiency due to rapid charging/discharging and exhibits semi-permanent cycle life characteristics without requiring maintenance because the deterioration due to repetitive charging/discharging is very small. Therefore, these supercapacitors are emerging as next-generation energy storage devices that can be used as secondary batteries or to replace batteries.

The storage capacity of the supercapacitor is proportional to the surface areas of an anode and a cathode facing each other, and it is possible to form an electrode having a relatively large surface area in the same area through an interdigitated electrode structure in which the branch portions protruding from the respective anode and cathode are alternated in the form of interdigitated fingers. The structure of the electrode having a wider surface area makes it possible to manufacture a micro-supercapacitor having a very small size.

Examples of the method of manufacturing the micro-supercapacitor include a method of using photolithography (Korean Patent No. 10-1582768) and a method of using screen printing (Korea Patent No. 10-1148126), and a new method of using plasma etching or the like has been developed in recent years.

Figure 13:
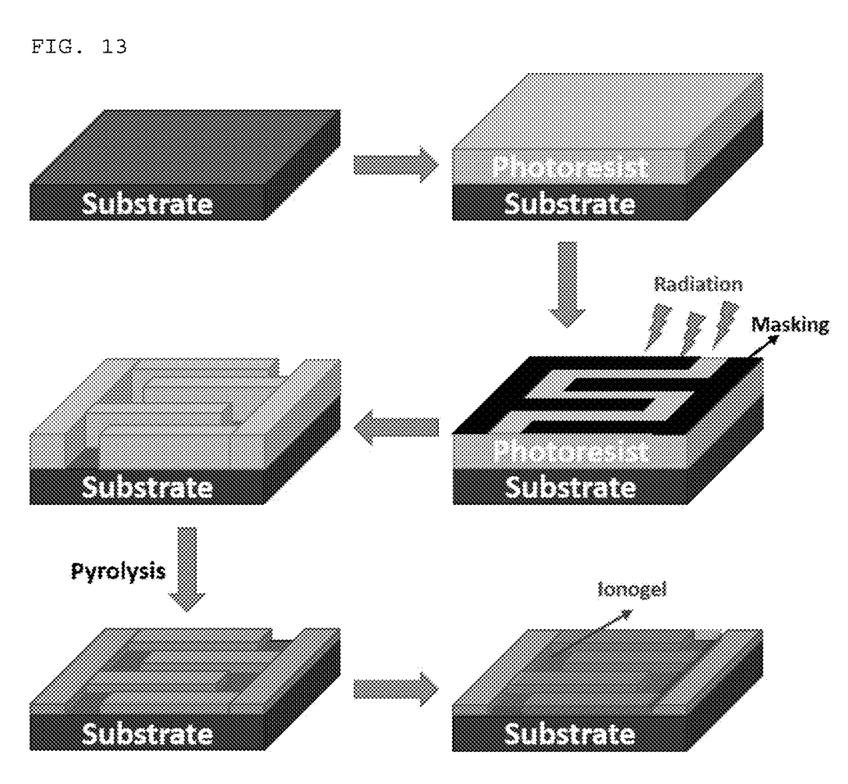
FIG. 13 is a schematic diagram illustrating a process of manufacturing a micro-supercapacitor by photolithography.
Figure 14:
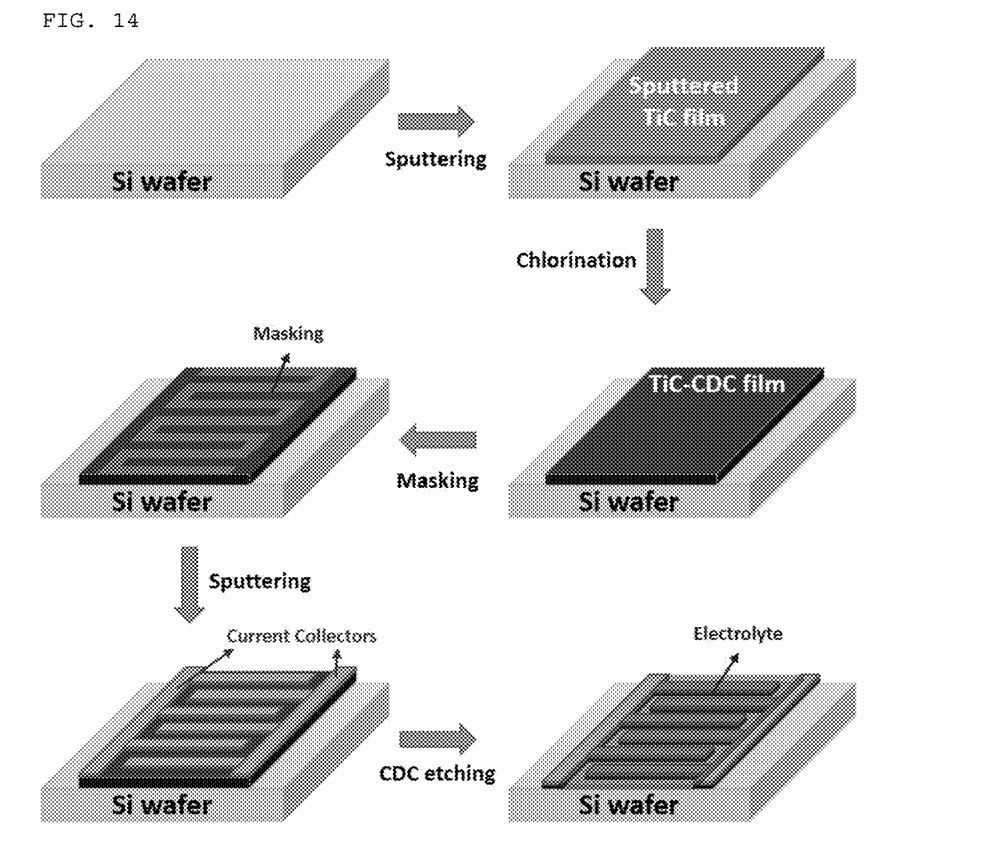
FIG. 14 is a schematic diagram illustrating a process of manufacturing a micro-supercapacitor by plasma etching.

FIG. 13 is a schematic diagram illustrating a process of manufacturing a micro-supercapacitor by photolithography. FIG. 14 is a schematic diagram illustrating a process of manufacturing a micro-supercapacitor by plasma etching.

These methods are capable of manufacturing a very small-sized supercapacitor, but are disadvantageous in that the manufactured supercapacitor does not have a sufficient storage capacity because its electrode is thin in thickness.

Accordingly, there is an increasing demand for new manufacturing methods capable of increasing the storage capacity of the micro-supercapacitor by thickening the electrode thereof.

CITATION LIST

Patent Literature

Patent Literature 1: Korean Patent No. 10-1582768
Patent Literature 2: Korean Patent No. 10-1148126

SUMMARY OF THE INVENTION

The present invention has been made in view of the above-mentioned problems, and it is an object of the present invention to provide a method of manufacturing a micro-supercapacitor with an increased storage capacity of electrical energy.

To accomplish the above object, in accordance with one aspect of the present invention, there is provided a method of manufacturing a high-capacity micro-supercapacitor including an anode and a cathode separated from each other, which includes forming a pair of current collectors by discharging conductive ink on a substrate surface with a 3D printer, and forming an electrode consisting of an anode and a cathode by stacking an electrode constituting material in the form of a plurality of layers on each of the pair of current collectors using the 3D printer.

The micro-supercapacitor is generally referred to as a supercapacitor manufactured at a very small size having a thickness of several hundreds of micrometers (μm) or less in an area of a millimeter or a centimeter scale although its standard is not specifically specified at present.

In accordance with another aspect of the present invention, there is provided a method of manufacturing a high-capacity micro-supercapacitor including an anode and a cathode separated from each other, which includes forming an electrode consisting of an anode and a cathode by stacking an electrode constituting material in the form of a plurality of layers on a substrate surface using a 3D printer, and forming a pair of current collectors by discharging conductive ink on the anode and the cathode with the 3D printer.

In order to increase the energy storage capacity of the very small-sized micro-supercapacitor, the present invention is characterized in that the electrode is stacked in the form of a plurality of layers using the 3D printer and a 3D printing technique is applied to the current collector. The present invention has an excellent effect in that the energy storage capacity is increased by stacking the electrode in the plurality of layers to make it thicker. In addition, unlike photolithography or plasma etching, it is possible to perform an on-board process because there are few restrictions on the position for performing current collector and electrode formation operations. Furthermore, the present invention is advantageous in that there is no waste of material generated when the constituent material is shaved for the formation of the current collector and the electrode.

The forming a pair of current collectors may include printing and forming a collector pattern by discharging the conductive ink with the 3D printer, and improving conductivity by covering a surface of the pattern formed of the conductive ink with a metal material having high conductivity.

When the current collector is formed by the 3D printer, it is advantageous to manufacture in the form of the current collector, but the electric conductivity of the current collector may be lowered. To resolve this problem, it is preferable to first print and form the pattern of the current collector using the conductive ink and then cover the surface of the pattern with a metal material having high conductivity to improve conductivity.

The improving conductivity may be performed by an immersion gold process, an electroless plating process, or an electroplating process.

In the forming an electrode, heat treatment may be further performed after a process of stacking the electrode constituting material using the 3D printer. The heat treatment is performed under necessary conditions according to the type applied to the 3D printer.

The 3D printers for discharging the conductive ink and the electrode constituting material may have a nozzle inner diameter of 180 μm or less. In detail, the forming a pair of current collectors and the forming an electrode may be performed with the same 3D printer.

In the forming an electrode, the electrode constituting material may be preferably stacked in ten or more layers. In order to manufacture the very small micro-supercapacitor, the nozzle of the 3D printer must be small. If the inner diameter of the nozzle exceeds 180 μm, it is difficult to manufacture the micro-supercapacitor. On the other hand, since the width of the electrode output from the nozzle is narrow, it is preferable to stack the electrode in ten or more layers in order to obtain a sufficient energy storage capacity.

In the forming a pair of current collectors, the pair of current collectors may preferably have an interdigitated electrode structure. In order to obtain a sufficient surface area of the electrode including the electrolytic material, it is preferable for the current collector to have an interdigitated electrode structure. Since the planar shape of the current collector is the same as that of the electrode, the current collector is formed in the interdigitated electrode structure.

In accordance with still another aspect of the present invention, there is provided a method of forming a current collector in contact with an electrode for manufacturing a micro-supercapacitor including an anode and a cathode separated from each other, which includes printing and forming patterns of a pair of current collectors by discharging conductive ink with a 3D printer, and improving conductivity by covering surfaces of the patterns formed of the conductive ink with a metal material having high conductivity.

The improving conductivity may be performed by an immersion gold process, an electroless plating process, or an electroplating process.

The 3D printer for discharging the conductive ink may preferably have a nozzle inner diameter of 180 μm or less. In the printing and forming patterns, the pair of current collectors may preferably have an interdigitated electrode structure.

The printing and forming patterns may be performed by discharging the conductive ink on the pre-formed anode and cathode with the 3D printer. In this case, the high conductive metal material is not in contact with the anode and the cathode even when the improving conductivity is performed, but the overall efficiency of the micro-supercapacitor is improved by lowering the resistance of the current collector and improving the efficiency thereof.

In accordance with yet another aspect of the present invention, there is provided a high-capacity micro-supercapacitor that includes a pair of current collectors separated from each other, an anode and a cathode formed on the respective current collectors, and an electrolytic material filled between the anode and the cathode, wherein the pair of current collectors is formed using a 3D printer, and the anode and the cathode are stacked in the form of a plurality of layers using the 3D printer to increase a volume for accommodating the electrolytic material.

The current collectors may be configured to form their patterns by discharging conductive ink with the 3D printer and then cover the surfaces of the patterns formed of the conductive ink with a metal material having high conductivity, so that the high conductive metal material is in contact with the anode and the cathode.

In accordance with a further aspect of the present invention, there is provided a high-capacity micro-supercapacitor that includes an anode and a cathode separated from each other, a pair of current collectors formed on the respective anode and cathode, and an electrolytic material filled between the anode and the cathode, wherein the pair of current collectors is formed using a 3D printer, and the anode and the cathode are stacked in the form of a plurality of layers using the 3D printer to increase a volume for accommodating the electrolytic material.

The current collectors may be configured to form their patterns by discharging conductive ink with the 3D printer and then cover the surfaces of the patterns formed of the conductive ink with a metal material having high conductivity, so that the high conductive metal material is disposed opposite to the anode and the cathode. The high conductive metal material is not in contact with the anode and the cathode even when the improving conductivity is performed, but the overall efficiency of the micro-supercapacitor is improved by lowering the resistance of the current collector and improving the efficiency thereof.

The anode and the cathode may preferably be stacked in ten or more layers. The current collectors may preferably have an interdigitated electrode structure.

DETAILED DESCRIPTION OF THE PREFERRED EMBODIMENTS

Reference will now be made in detail to exemplary embodiments of the present invention, examples of which are illustrated in the accompanying drawings.

A supercapacitor is an energy storage device that uses an electrolyte in place of a dielectric and stores electrical energy by forming a pair of charge layers (electric double layers), having different signs, included in the electrolyte on the surface of an electrode. Supercapacitors are sometimes referred to as electrochemical double layer capacitors (EDLCs). There were developed pseudo-capacitors that have an improved structure for storing electrical energy in both of an anode and a cathode by means of an electric double layer to store charge by a very rapid and reversible oxidation-reduction reaction occurring at the interface between an electrode and an electrolyte ion, hybrid capacitors that use asymmetric electrodes applying different methods to an anode and a cathode to use a high-capacity electrode material for one of them and a high-output electrode material for the other so as to improve the capacity characteristics of the supercapacitor, or the like.

The pseudo-capacitor and the hybrid capacitor differ from the supercapacitor in that they do not physically accumulate the charge, but they are in the form of the supercapacitor in overall structure, with the consequence that the method of manufacturing the supercapacitor is applicable thereto. Therefore, the term supercapacitor in the present specification is used not only as an electric double layer capacitor but also as an upper concept including all capacitors having the same structure such as pseudo-capacitors and hybrid capacitors. Accordingly, the technique described using the term supercapacitor in the specification should not be limited to electric double-layer capacitors but should be applied to pseudo-capacitors and hybrid capacitors.

Figure 1:
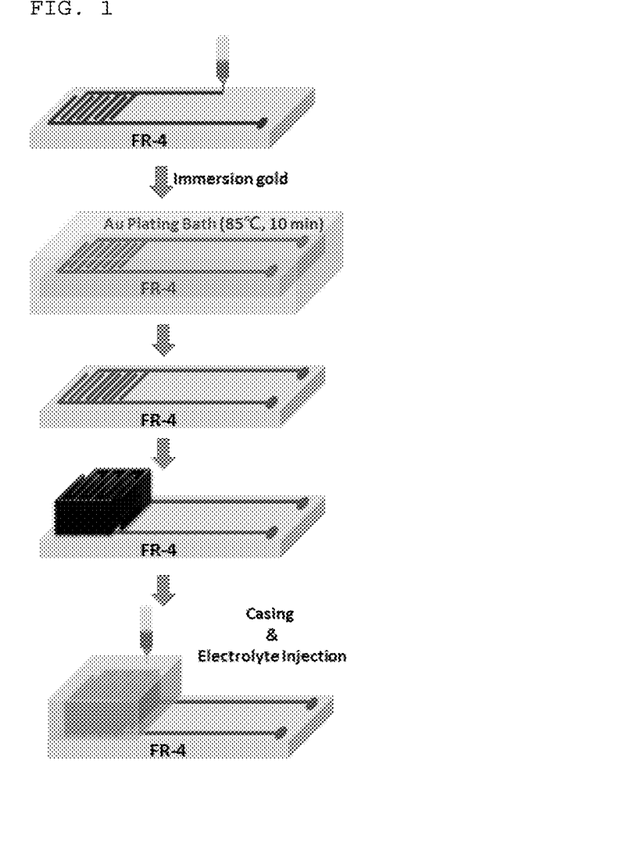
FIG. 1 is a schematic diagram illustrating a process of manufacturing a micro-supercapacitor according to an embodiment of the present invention.

FIG. 1 is a schematic diagram illustrating a process of manufacturing a micro-supercapacitor according to an embodiment of the present invention.

The present invention is characterized in that a current collector, an anode, and a cathode constituting a micro supercapacitor are formed by printing with a 3D printer. A process of forming a current collector is illustrated in the top of FIG. 1.

In the present embodiment, metallic ink is first discharged to a 3D printer to form a collector pattern in a desired shape. To this end, a metal anode and cathode are formed by printing with a 3D printer.

The metallic ink is prepared by mixing a binder material and a nickel metal powder. In more detail, the metallic ink is prepared by mixing a binder material and a nickel metal powder using a revolution/rotation type stirring device (Mazerustar KK-100, KURABO) having various sizes of stainless steel balls (diameters of 4, 6, 8, and 10 mm). In this case, it is preferable to mix 3 to 40 wt % of the binder material and 60 to 97 wt % of the nickel powder.

The metal powder content of the metallic ink must be 60 wt % or more based on the solid content. When the metal powder is 60 wt % or more, the contact between the powders is possible to serve as a current collector. Although a nickel metal powder is used as the metal powder in the embodiment, the present invention is not limited thereto. For example, silver, platinum, gold, molybdenum, chromium, titanium, carbon, iron, aluminum, copper, or the like may be used.

The prepared metallic ink is transferred to a syringe dedicated to a dispenser type 3D printer having a metal needle (diameter of 180 μm, SNA-28G) attached thereto by luer-lok.

In order to form a current collector pattern using the prepared metallic ink, the structure of the current collector must be first determined (designed). Since the same-shaped electrodes are formed on the current collector in the manufacturing method of the present invention, the structure of the current collector is the structure of the electrode.

Figure 2:
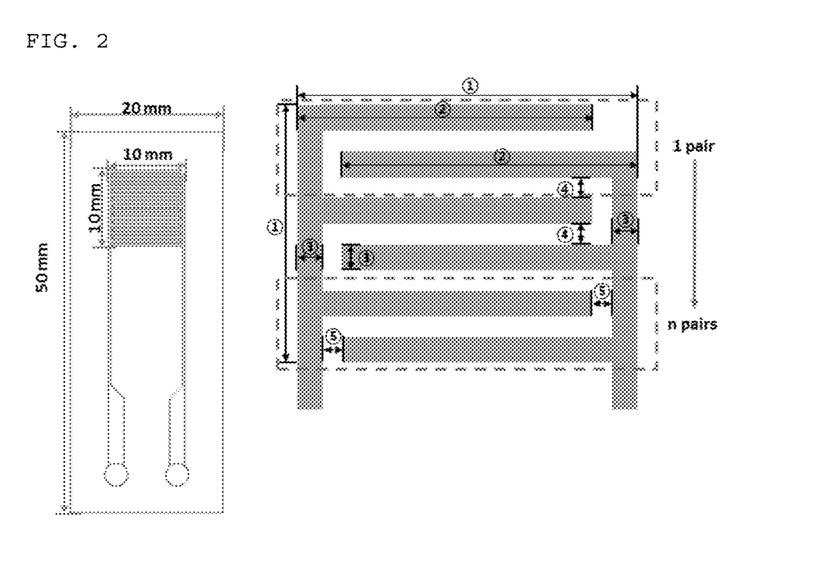
FIG. 2 is a view illustrating a structure of a current collector that is 3D-printed in the embodiment.

FIG. 2 is a view illustrating the structure of the current collector that is 3D-printed in the embodiment.

In the embodiment, a substrate on which the micro-supercapacitor is mounted is 20×50 mm in size, a portion where the current collector and the electrode material are printed is 10 mm×10 mm in area, an interdigitated electrode structure is applied in which the branch portions protruding from the respective anode and cathode are alternated in the form of interdigitated fingers so that the surface area of the electrode is large, and a width and a spacing are designed according to the number of protruding branches as in the following Table 1.

TABLE 1

| n pairs | ① (total x- & y- axis length) | ② (one x- axis length) | ③ (line width) | ④ (spacing between x axes) | ⑤ (spacing between x and y axes) |
|---|---|---|---|---|---|
| 10 pairs | 10.0 mm | 9.49 mm | 270 μm | 230 μm | 230 μm |

The drawing in which metallic ink is discharged is produced by computer software and uses a PC-controlled image recognition application system.

The current collector pattern is formed by discharging metallic ink in the form of a pre-designed current collector on a FR-4 substrate of 20×50 mm. The typical printing speed of ink by 180 μm nozzles is 4 mm/s, its pressure is 100 kPa, and a high-precision dispenser type 3D printer corresponding to pneumatic viscosity change is used.

Although the FR-4 substrate is used as a printed circuit board (PCB) in the embodiment, the present invention is not limited to a type of a substrate because the current collector is formed by 3D printing. Accordingly, the present invention is advantageous in that the manufacturing process is very simple and the manufacturing cost is lowered, compared to the conventional method of manufacturing the micro-supercapacitor mounted on the PCB in which the manufacturing process is complicated and the expensive equipment is used and the manufacturing cost is very high.

Figure 3:
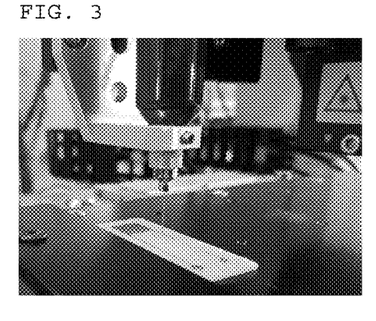
FIG. 3 is a photograph illustrating a state in which metallic ink is discharged to form a current collector pattern in the embodiment.
Figure 4:
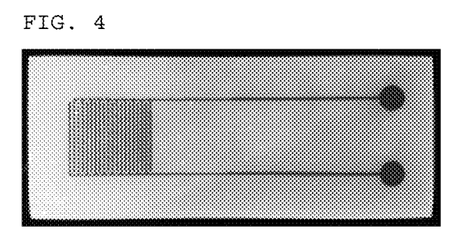
FIG. 4 illustrates a result of forming a current collector pattern on a substrate surface by 3D printing.

FIG. 3 is a photograph illustrating a state in which the metallic ink is discharged to form the current collector pattern in the embodiment. FIG. 4 illustrates a result of forming the current collector pattern on the surface of the substrate by 3D printing.

Although the metallic ink prepared by mixing the metal powder with the binder is used in the process of forming the collector pattern in the embodiment, the present invention is not limited to using the metal powder. Conductive ink made of a conductive material may be used to perform the function of the current collector. For example, conductive ink prepared in the form of ink using a conductive polymer (PEDOT: PSS, polyaniline, pyrrole, polythiophene, poly(phenylenevinylene), poly(thienylene-vinylene), or the like) may be used.

Meanwhile, the collector pattern is formed by discharging the metallic ink to the 3D printer so as to form the small-sized current collector for the micro-supercapacitor on various substrates in the present invention. However, such a collector pattern is disadvantageous in that its electric conductivity is not excellent.

In order to resolve this problem, the present invention further includes a process for improving the electrical conductivity of the collector pattern.

In order to form a current collector having high electric conductivity, a method of covering the surface of the current collector pattern with a metallic material having high electric conductivity may be used. A method of coating a material having high electric conductivity by an electroless plating process which is applicable to various substrates and is easy may be used in the embodiment. In more detail, the current collector covered with Au is formed by an immersion gold process which is one of gold plating methods. The general electroless plating process, in which a material having high conductivity such as Au is attached to the surface of the collector pattern using a catalyst, differs from the immersion gold process in which a gold plating layer is formed on the surface of the current collector pattern by substitution reaction of Ni and Au. Therefore, unlike the case where the plating layer is continuously thickened in the state in which it is immersed in the plating bath, the immersion gold process enables a very thin gold plating layer to be formed since the growth of the gold plating layer stops when Ni is completely substituted on the surface. Electroplating may also be applied because the collector pattern is conductive.

In the embodiment, two solutions used of a commercially available solution (gold plating solution, electroless, metal content=3.7 g/l, Alfa Aesar) and a solution directly prepared (by mixing 200 mL of distilled water with 0.2 g of potassium dicyanoaurate $(Kau(CN)_2)$, 5.0 g of sodium citrate $(Na_3C_6H_5O_7)$, and 8.0 g of ammonium chloride $(NH_4Cl)$ and stirring it for 30 minutes) are used. The substrate on which the current collector pattern is printed is placed in the solution, and the solution is increased to a temperature of 85° C. and maintained for 10 minutes. As a result, there is no difference in the plating degree depending on the solution.

Figure 5:
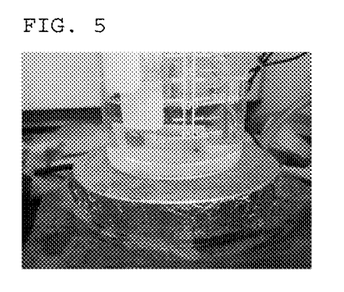
FIG. 5 is a photograph illustrating a state in which an immersion gold process is performed on the surface of the current collector pattern in the embodiment.
Figure 6:
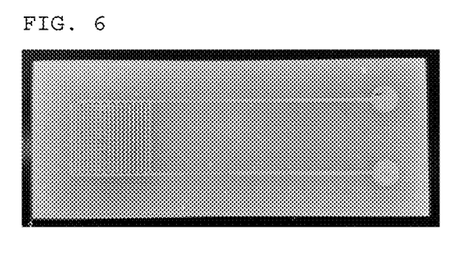
FIG. 6 illustrates a result of forming a gold plating layer on the surface of the current collector pattern formed by 3D printing.

FIG. 5 is a photograph illustrating a state in which the immersion gold process is performed on the surface of the current collector pattern in the embodiment. FIG. 6 illustrates a result of forming the gold plating layer on the surface of the current collector pattern formed by 3D printing.

The current collector, the surface of which is formed with a gold plating layer having high conductivity, is formed by the above process, and then the anode and the cathode are formed by printing with a 3D printer.

The state in which the electrode is formed on the current collector is illustrated in the fourth part of FIG. 4.

In order to form the anode and the cathode by printing with the 3D printer, electrode ink containing an electrode material must also be prepared.

The electrode ink is prepared by mixing a binder material, carbon black (Super-P®) as a conductive agent, and activated carbon (YP-50F, Kuraray Chemical) as an electrode active material. 3 to 50 wt % of the binder, 3 to 40 wt % of the conductive agent, and 50 to 97% of the electrode active material are mixed based on the solid content.

Since the shape of the anode and the cathode is the same as that of the current collector as described above, 3D printing is performed by replacing only the syringe in the 3D printer.

Figure 7:
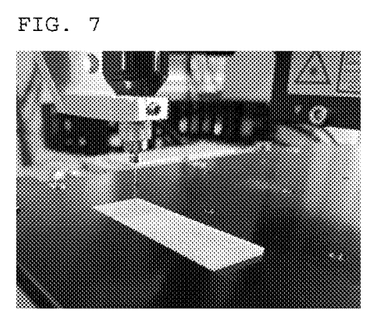
FIG. 7 is a photograph illustrating a state in which electrode ink is discharged to form an electrode on a current collector in the embodiment.
Figure 8:
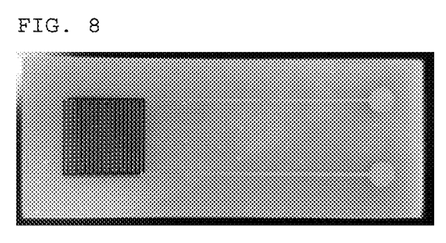
FIG. 8 illustrates a result of forming an electrode on the surface of the current collector pattern by 3D printing.

FIG. 7 is a photograph illustrating a state in which the electrode ink is discharged to form the electrode on the current collector in the embodiment. FIG. 8 illustrates a result of forming the electrode on the surface of the collector pattern by 3D printing.

In the process of forming the anode and the cathode using the 3D printer, at least two or more layers are stacked to increase the thickness of the electrode and increase the volume for accommodating the electrolytic material. In the embodiment, 10 layers are stacked. The 3D printer is a device for manufacturing a three-dimensional structure, and manufactures a three-dimensional structure by stacking a raw material in the form of a plurality of layers according to the design drawing. In the embodiment, the thick (or high) electrode of the micro-supercapacitor is formed by repeatedly stacking the electrode constituting material using the feature of the 3D printer capable of repeatedly stacking the raw material.

For 3D printing, the ink applying the electrode constituting material to the solvent is used. Therefore, it is preferable to apply the process of removing the solvent through heat treatment.

The micro-supercapacitor capable of charging and discharging energy is completed in such a manner that the electrode completed through the heat treatment is covered by a case for fixing the electrolytic material therein and the electrolytic material is injected into the case to be filled between the anode and the cathode.

Electrochemical characteristics of the micro-supercapacitor manufactured by the above process are measured.

[EMIM]-TFSI(1-Ethyl-3-methylimidazolium bis(trifluoromethylsulfonyl)imide), which is an ionic liquid, is used as the electrolytic material.

Figure 9:
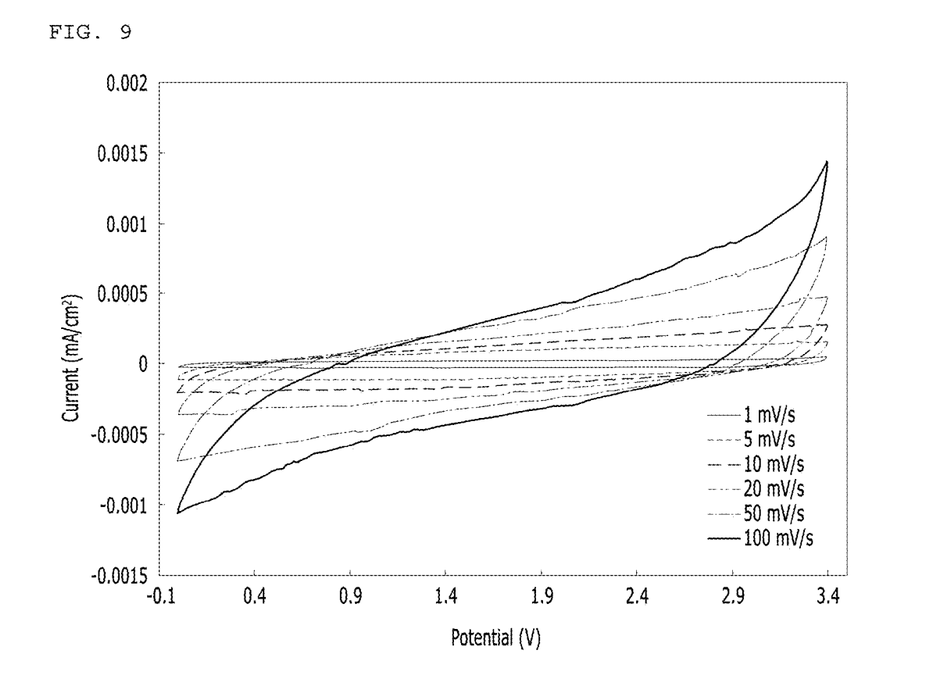
FIG. 9 illustrates a cyclic voltage-current curve measured while changing a scan rate for a micro-supercapacitor according to an embodiment of the present invention.

FIG. 9 illustrates a cyclic voltage-current curve measured while changing a scan rate for the micro-supercapacitor according to the embodiment of the present invention.

The current-voltage curve is plotted while the voltage is changed from 0 to 3.4 V and the scan rate is changed from 1 to 100 mV/S. The cyclic voltage-current curve for the micro-supercapacitor in the embodiment is a CV curve that appears in a general supercapacitor, and the area of the closed curve increases as the scan rate increases.

Figure 10:
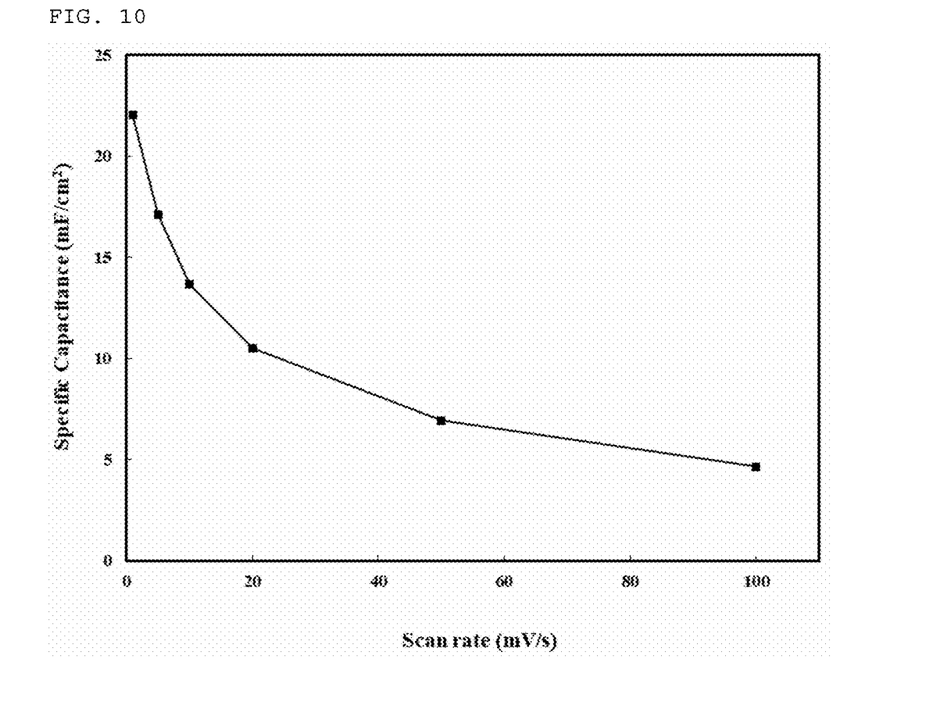
FIG. 10 is a result of measurement of a capacitance to a scan rate for the micro-supercapacitor according to the embodiment of the present invention.

FIG. 10 is a result of measurement of a capacitance to a scan rate for the micro-supercapacitor according to the embodiment of the present invention.

The specific capacitance of the micro-supercapacitor is measured while the scan rate is changed from 1 to 100 mV/S at a driving voltage of 3.4 V. In the embodiment, the specific capacitance of the micro-supercapacitor decreases as the scan rate increases.

Figure 11:
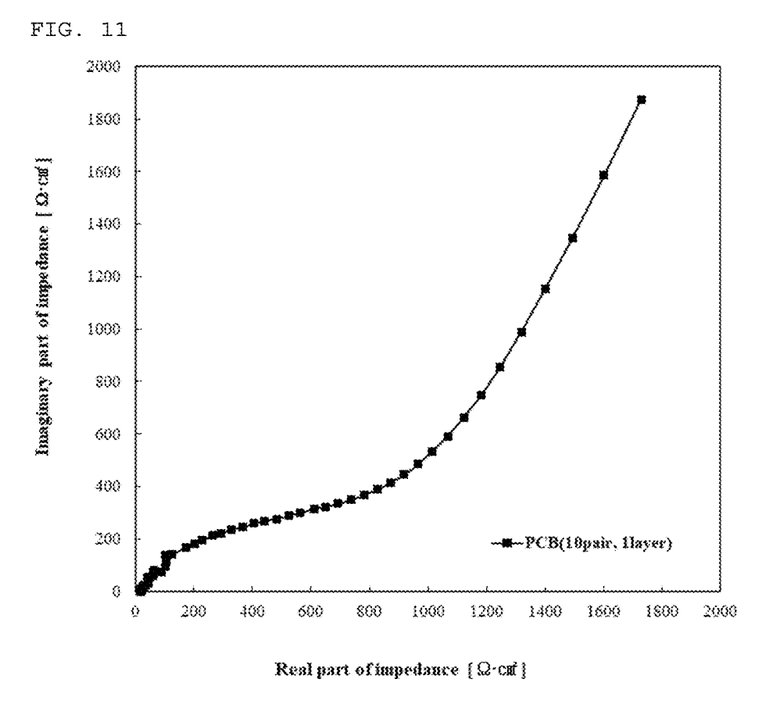
FIG. 11 is a result of impedance for the micro-supercapacitor according to the embodiment of the present invention.

FIG. 11 is a result of impedance for the micro-supercapacitor according to the embodiment of the present invention.

The typical behavior of the supercapacitor which is upright at high frequency is illustrated in the graph.

Although the interdigitated electrode structure is applied to widen the surface area of the electrode in the above embodiment, the present invention is not limited thereto. In particular, since the current collector and the electrode are formed using the 3D printer in the present invention, their shapes are not limited and various structures for widening the surface area of the electrode may be applied thereto.

Figure 12:
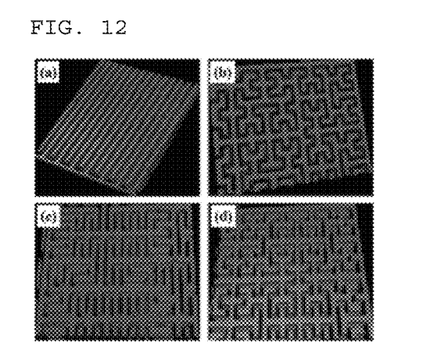
FIG. 12 is a view illustrating shapes of various electrodes and current collectors applicable in the process of manufacturing the micro-supercapacitor according to the present invention.

FIG. 12 is a view illustrating shapes of various electrodes and current collectors applicable in the process of manufacturing the micro-supercapacitor according to the present invention.

In the case where the shapes of the electrode and the current collector are complicated, there is a problem in that it is difficult to manufacture the supercapacitor or its manufacturing cost is increased in the conventional manufacturing method. However, since the 3D printer is used in the present invention, both electrode and current collector having high efficiency can be formed even though the structure is very complicated.

In the above embodiment, the method and structure are proposed of first forming the current collector on the substrate and then forming the anode and the cathode on the current collector. This is a structure in which the surface of the first-formed current collector is covered with gold having high conductivity, and then the anode and the cathode come into contact with the gold (Au) layer on the surface of the current collector, thereby facilitating the movement of the electrode from another electrode to the current collector.

However, in another embodiment of the present invention, it is possible to form an anode and a cathode first and then form a current collector thereon by a 3D printer. In addition, it is possible to form a metal layer (Au layer) having high conductivity on the surface of the exposed current collector as in the above embodiment.

In this case, although the gold (Au) layer formed on the current collector is not in direct contact with the anode and the cathode, electrons can migrate to the anode and the cathode through the body of the current collector formed using the conductive ink. Due to the characteristics of the current easily flowing to a low resistance region, the overall resistance of the current collector is lowered by the gold (Au) layer formed on the current collector to improve the efficiency of the current collector. Finally, the efficiency of the micro-supercapacitor is improved.

As described above, the supercapacitor manufactured by the method of the present invention has an excellent effect in that the amount of the electrolytic material filled between the micro-sized anode and cathode is increased and the amount of electric energy stored in one cell of the micro-supercapacitor is remarkably increased since the thickness (height) of the electrode is larger than the width of the thin electrode wall.

In addition, since the current collector is formed by the 3D printer, an on-board process is possible because there are few restrictions on the position for performing current collector formation and electrode formation operations. Furthermore, the present invention is advantageous in that there is no waste of material generated when the constituent material is shaved for the formation of the current collector and the electrode.

As is apparent from the above description, according to the present invention, it is possible to form the electrode by stacking it in the form of a plurality of layers using the 3D printer, thereby forming the micro-sized thick electrode. Finally, it is possible to manufacture the micro-supercapacitor having an increased energy storage capacity.

In addition, it is possible to perform an on-board process because there are few restrictions on the position for performing electrode formation operation.

Furthermore, the present invention is advantageous in that there is no waste of material generated when the constituent material is shaved for the formation of the current collector and the electrode.

While the present invention has been described with respect to the specific embodiments, it will be apparent to those skilled in the art that such embodiments are provided by way of example only and that various changes and modifications may be made without departing from the spirit and scope of the invention as defined in the following claims. It will be understood that various modifications and other equivalent embodiments may be made without departing from the spirit and scope of the invention as defined in the following claims and the protection scope of the present invention should be defined by technical concepts of the appended claims.

What is claimed is:

1. A method of manufacturing a high-capacity micro-supercapacitor comprising an anode and a cathode separated from each other, the method comprising:
    forming a pair of current collectors by discharging conductive ink on a substrate surface with a 3D printer; and
    forming an electrode including the anode and the cathode by stacking an electrode constituting material in a form of a plurality of layers on each of the pair of current collectors using the 3D printer,
    wherein the forming the pair of current collectors comprises:
        printing and forming a current collector pattern by discharging the conductive ink with the 3D printer; and
        improving conductivity by covering a surface of the current collector pattern formed of the conductive ink with a metal material having high conductivity, and
    wherein the metal material having high conductivity has higher conductivity than the current collector pattern.

2. The method according to claim 1, wherein the improving conductivity is performed by an immersion gold process.

3. The method according to claim 1, wherein in the forming the electrode, heat treatment is further performed after a process of stacking the electrode constituting material using the 3D printer.

4. The method according to claim 1, wherein in the forming the pair of current collectors, the 3D printer for discharging the conductive ink has a nozzle inner diameter of 180 μm or less.

5. The method according to claim 1, wherein in the forming the electrode, the 3D printer for discharging the electrode constituting material has a nozzle inner diameter of 180 μm or less.

6. The method according to claim 5, wherein in the forming the electrode, the electrode constituting material is stacked in ten or more layers.

7. The method according to claim 1, wherein in the forming the pair of current collectors, the pair of current collectors has an interdigitated electrode structure.

8. The method according to claim 1, wherein the conductive ink is metallic ink.

9. The method according to claim 1, wherein the anode and the cathode come into contact with the metal material having high conductivity covered on the surface of the current collector pattern.

10. The method according to claim 1, wherein the forming the pair of current collectors further comprises designing a structure of the pair of current collectors to form the current collector pattern.

* * * * *